April 17, 1973 R. WISOTZKY ET AL 3,728,182
METHOD OF PREPARING RESIN-BACKED TUFTED CARPET TILES
Filed June 25, 1971
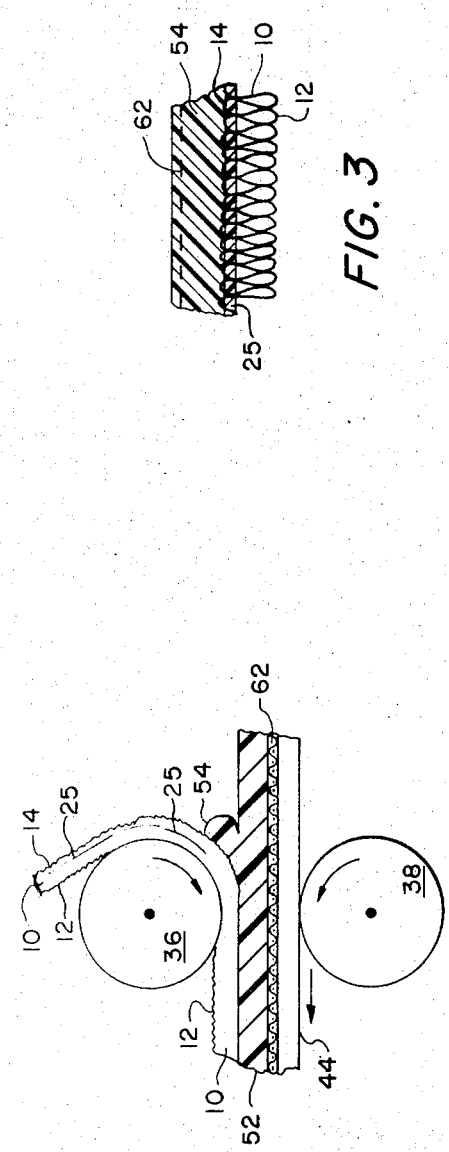
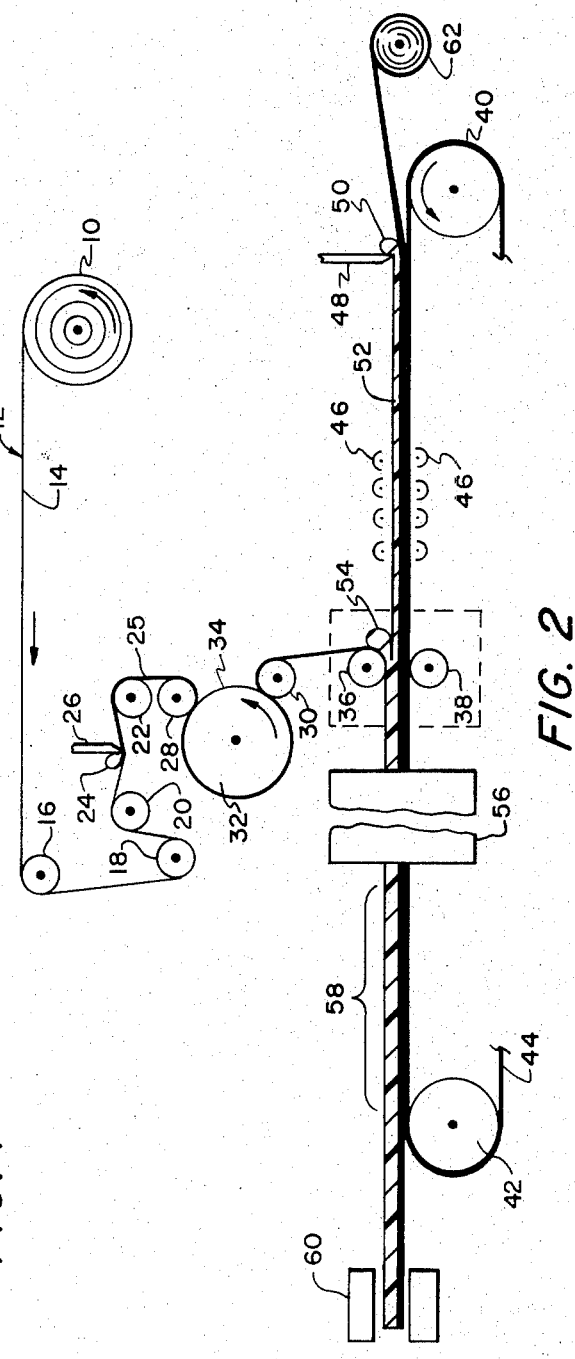
INVENTORS
REUBEN WISOTZKY
DAVID K. SLOSBERG
BY
CROWLEY AND STEVENS
Crowley & Stevens
ATTORNEYS United States Patent Office 3,728,182
Patented Apr. 17, 1973

3,728,182
METHOD OF PREPARING RESIN-BACKED
TUFTED CARPET TILES
Reuben Wisotzky, Lexington, Mass., and David K. Slosberg, Atlanta, Ga., assignors to Pandel-Bradford, Inc., Lowell, Mass.
Filed June 25, 1971, Ser. No. 156,830
Int. Cl. B32b 5/02
U.S. Cl. 156—72                                          20 Claims

ABSTRACT OF THE DISCLOSURE

A method of preparing dimensionally stable solid vinyl resin-backed carpet tiles characterized by a fibrous face, which method comprises: laying the surface of a precoated tufted carpet under pressure between opposing rolls having a fixed adjustable gap therebetween onto the wet surface of a heavily loaded vinyl resin plastisol layer deposited on a release surface while maintaining a rolling bank of a liquid resinous material at the nip of the opposing rolls during the laying process; fusing the heavily loaded vinyl resin layer to the back of the carpet; cooling the fused layer; stripping the fused layer from the release surface; and cutting the solid vinyl resin-backed carpet so prepared into carpet tile sections.

BACKGROUND OF THE INVENTION

Carpet tiles have been prepared by coating or otherwise laminating a heavily loaded solid resin backing to the back surface of a tufted carpet, and, thereafter, cutting the carpet into appropriate tile sections. Typically, the solid backing comprises from about 100 up to 250 parts of a filler per hundred parts of resin; that is, the backing is heavily loaded, both for economic reasons and to impart weight and dimensional stability to the resulting carpet tile. The solid backing should retain sufficient flexibility to enable the carpet tile to lay flat against an irregular floor surface. Prior to securing the heavily loaded solid resinous backing to the carpet, the carpet is often pretreated with a precoating compounded latex or other resinous material in order to provide tuft lock to the fibers of the carpet.

Such solid, heavily loaded, backed tufted carpets have been prepared in general by two methods. One method comprises the direct coating onto the back surface of the tufted carpet of a thick vinyl resin plastisol layer. This method has several distinct disadvantages which have, in the past, effectively prohibited its wide commercial adoption and use. Another method involves a laying-in technique wherein the back surface of the carpet is laid into a cast layer of the heavily loaded vinyl resin material. Both techniques at present contain inherent disadvantages which often result in commercially unacceptable carpet tile products. For example, the back of the carpet, even when precoated, is quite often an irregular uneven surface. In addition, the overall thickness of the tufted or even woven carpet where a woven face is employed may vary considerably due to the compressibility, density, directional differences, adsorption and other factors. Based on this, the coating thickness in a direct coating method is subject to local variations which often produce a commercially unacceptable product.

Where a heavily loaded solid vinyl backing plastisol is employed, the weight of the plastisol requires the carpet to be supported, not only at the inititial coating stage, but throughout the entire heating and cooling steps. Often, tentering; that is, supporting the carpet at the selvage only, is inadequate, since severe distortion and stretch due to the weight of backing compound results. Further, in both techniques, the use of a conveyor belt under the carpet often severely restricts heat transfer characteristics through the face of the carpet providing for lengthy ovens or overly long heating times and temperatures. In a laying-in technique, where the precoated tufted carpet is laid into a heavily loaded vinyl resin material on a conveyer belt, other difficulties often arise. The laying-in technique often is accompanied by air-entrapment between the back surface of the tufted carpet and the heavily loaded solid layer, which air-entrapment promotes unacceptable carpet tiles due to such air bubbles and blisters. In addition, the distortion and stresses involved due to the uneven surface gage prevents complete contact of the back of the carpet with the heavily loaded backing.

Lamination techniques by fusing a preformed plastisol layer to the back surface of a carpet may be employed; however, these techniques often require considerably more heat and pressure than required in other operations. For example, this technique, although it may be employed in connection with expanded thermoplastic foam, such as set forth in U.S. Pat. 3,560,284, is not practical with a solid vinyl layer which is an excellent heat sink compared to the vinyl foam layer. Accordingly, the present techniques of preparing resinous-backed carpet tiles are not wholly satisfactory.

It is an object of this invention to provide a method for preparing resin-backed tufted carpet tiles which overcome many of the difficulties associated with the prior art practices.

SUMMARY OF THE INVENTION

Our invention concerns a method of preparing carpet and carpet tiles characterized by a solid or foamed resinous backing secured to said carpet and to the carpet and carpet tiles so produced. In particular, our invention relates to a method of preparing dimensionally stable solid vinyl resin-backed tufted carpet tiles. More particularly, our invention is directed to a method of preparing dimensionally stable tufted carpet tiles, which method comprises: laying the surface of a precoated tufted carpet under pressure between opposing rolls onto the surface of a heavily loaded vinyl resin plastisol layer while maintaining at the nip between the laying-in rolls a bank of a liquid resinous material. Further, our method of preparing tufted carpet tiles comprises maintaining a fixed but adjustable gap between the opposing pressure rolls, while maintaining a liquid rolling bank of resinous material at the nip during the laying-in process.

Our invention overcomes many of the difficulties and disadvantages associated with prior art techniques in the preparation of a resin-backed carpet or solid heavily loaded vinyl resin-backed carpet tiles, either by the laying-in or direct coating techniques. In our method, through maintaining a fixed adjustable gap between the opposing pressure rolls alone or in combination with maintaining a rolling bank of a liquid resinous compound at the nip, such as a vinyl chloride resin plastisol compound across the full width of the carpet, many advantages in the method and the resulting product are obtained thereby. By our method and techniques, a constant total thickness of the carpet completely within commercial tolerance; that is, plus or minus .005 of an inch, can be achieved. Further, our techniques provide for the complete wetting of the back of the carpet by the vinyl cast backing layer, thereby insuring an excellent contact and enhanced bond strength on subsequent fusion and lamination of the backing in the heating step. Furthermore, our techniques through maintaining a rolling liquid bank of either the precoat or preferably the heavily loaded vinyl chloride cast backing compound at the nip or both, prevents or inhibits the incorporation of air pockets and blisters between the precoat layer and the cast backing layer. Our method also permits bonding between the back of the carpet and the cast vinyl solid backing with a limited amount of heat, since our technique permits a limited amount of preheat to be used on the heavily loaded cast backing or precoat layer before actual laying-in of the back of the carpet occurs, so long as a rolling bank is maintained at the nip. Therefore, our techniques in particular provide for commercially acceptable resin-backed carpet tiles to be prepared with good bonding between the backing of the carpet and without the inclusion of air pockets.

In one embodiment of our invention, we provide for the incorporation into the resin backing of the carpet tile of one or more layers of a scrim-like sheet material in order to impart or enhance the dimensional stability characteristics or other properties of the resulting carpet or tile. For example, a scrim sheet material; that is, an open scrim-like material, such as a woven or nonwoven fiber glass scrim, may be incorporated at either surface of the cast backing layer or within the layer itself as desired in order to provide reinforcement of the resulting carpet tile. Such scrim material lends additional dimensional stability to the carpet tile and, for example, prevents distortion of the carpet or tiles in use under heavily loaded wheel carts or traffic. The use of an open dimensionally stable scrim within the cast backing layer is particularly useful where the carpet tiles are not normally installed on a surface with adhesive so that they are subject to some movement with pressure.

In another embodiment of our method, either the precoat or the solid backing layer may be comprised of cross-linkable components (i.e., monomers or polymers) so as to impart further dimensional stability to the resulting carpet tiles. In such a method, the cross-linking or curing of the cross-linkable resinous materials to bond the solid back to the back of the carpet would occur in the heating step after the laying-in step. Such a method has the advantage in that the resulting carpet tiles exhibit superior bonding characteristics between the solid heavily loaded vinyl resin backing and the precoat on the back surface of the carpet, thereby preventing delamination of the solid backing under open-flame or heat conditions. Delamination of the backing under such conditions often results in products with poor flame-resistant characteristics and inhibit the use of the products in areas, such as nursing homes, hospitals, schools and the like. The thermoplasticity or the thermosetting; that is, the degree of cross-linking characteristics, of the precoat and backing coat should be matched, so as to inhibit subsequent curl of the edges of the carpet tiles; otherwise, the carpet edges may tend to curl in the direction toward the most heavily cross-linked or thermosetting material. Curing may be accomplished by curing agents, such as peroxide or by radiation, after the laying-in step.

Our method and the carpet tiles resulting therefrom will be described in particular as regards the preparation of a tufted carpet tile having a vinyl plastisol precoat and a vinyl plastisol solid backing coat; however, this is for the purposes of illustration of our method and invention only. It is recognized that our methods may be usefully employed for the preparation of other carpets and sheet materials, such as carpets having a fibrous woven or nonwoven face; for example, of a synthetic polymer fiber, and further, that the particular formulations used in the precoat or the solid backing may vary. For example, a precoating may constitute any material, such as compounded latex or other material which serves to lock the tufted fibers of the carpet in.

DRAWINGS

FIG. 1 represents a schematic illustration of our method for preparing a tufted carpet tile.

FIG. 2 is an enlarged fragmentary view of a portion of the method as shown in dotted outline in FIG. 1.

FIG. 3 is an enlarged fragmentary illustrative cross-sectional view of a carpet tile as produced in FIGS. 1 and 2.

DESCRIPTION OF THE PREFERRED EMBODIMENTS

FIG. 1 shows a tufted carpet 10 having a face 12 composed of a plurality of fibrous tufts and an irregular back 14 composed of a plurality of back stitches from the fibrous tufts. The carpet is passed over rolls 16 and 18 to present the back surface of the carpet to a precoating station composed of a coating knife 26 wherein a vinyl chloride resin plastisol precoat formulation 24 is doctored by the knife onto the irregular back surface 14 with the carpet maintained in coating position by tension between rollers 20 and 22 to form a layer 25. The vinyl chloride resin plastisol precoat formulation is typically not heavily loaded with filler and has a lower viscosity than the vinyl chloride resin backing layer. The precoat formulation is adapted to permit the locking of the tufts to the base of the carpet and is typically applied in an amount of from about 10 to 35 ounces per square yard; for example, 20 to 30 ounces per square yard.

The carpet 10 having a layer 25 of precoat formulation of about 2 to 20 mils; e.g., 5 to 12 mils in thickness, is then passed about rollers 28 and 30 and the precoated back surface 25 placed in contact with the surface of a larger diameter steamheated roll 32, the temperature of the roller adapted to solidify; i.e., gell or fuse, the precoat. Roll 32 is heated to a temperature sufficient to either gell or fuse the vinyl plastisol precoat during the time the precoat layer 25 is in contact with the release surface 34. The roll temperature may vary from 250° F. to 350° F.; for example, 275–325° F. Optionally, the roll may contain a release surface 34 thereon, such as a fluoroethylene resin, such as Teflon or a silicone resin, in order to permit the easy removal of the gelled or fused precoat. Gelling or fusing a vinyl plastisol precoat prior to the laying-in step is a preferred embodiment which results in a tufted carpet tile having enhanced tuft lock and pill resistance.

A heavily loaded viscous vinyl chloride resin plastisol backing formulation 50 is cast by a coating knife 48 or other means onto the surface of a continuous belt 44 supported by rolls 40 and 42 to form a backing layer 52 of, for example, 40 to 250 mils in thickness. The vinyl plastisol backing formulation comprises from about 35 to 200 parts of filler per hundred parts of resin, while the precoat vinyl plastisol formulation typically has less than 150 parts of filler per hundred parts of resin; for example 0 to 125. The vinyl plastisol backing is applied in amounts from about 50 to 150 ounces per square yard of carpet. The belt 44 may comprise steel, fiber glass, Teflon, etc., or be coated, treated or otherwise formed to have a surface so that the backing layer 52 may be readily stripped therefrom after fusion, or if desired, the layer 52 cast onto a casting paper of sheet material with surface release characteristics which is supported by belt 44.

Prior to casting the layer 52 of vinyl plastisol backing onto the surface of the continuous belt 44, a layer of a fiber glass woven open-weave scrim sheet material 62 may be deposited on the surface of the continuous belt 44 and the vinyl plastisol backing formulation cast onto the fiberglass scrim material. The backing layer 52 is then preheated through the use of radiant heaters 46. If desired, the preheat may be accomplished by passing through an oven or by optionally heating only the surface of the backing layer 52. Preheating should not be sufficient in this embodiment to fuse the vinyl plastisol backing layer, since the backing layer should be sufficiently soft; that is, in a gell stage or prewarmed liquid stage prior to gell, to form a rolling bank of the plastisol material in the laying-in operation.

The tufted carpet 10 with the layer of gelled or fused vinyl precoat 25 and the preheated layer 52 of the vinyl backing on the belt 44 are then passed between two opposing rolls 36 and 38, preferably steel rolls, the rolls having a preset gap between their respective surfaces with a micrometer adjustment of, for example, 200 to 600 mils with provision made for instant release of the pressure at splices or during emergency situations. As the carpet 10 passes about roll 36 and into the nip between the two rolls, the carpet face 12 is compressed and the back of the carpet laminated or forced under pressure onto the exposed surface of the preheated vinyl plastisol backing layer 52. As the carpet face is compressed onto the nip and forced into intimate contact with the backing layer 52, a rolling bank 54 of the liquid vinyl plastisol backing composition 50 is formed at the nip in a manner as generally illustrated across the entire width of the tufted carpet. An adequate amount of the liquid rolling bank material must be maintained in order to prevent air pockets from developing during the laying-in operation as described, which air bubbles or pockets will be detrimental to the quality of the resulting carpet tile product. The amount of the rolling liquid bank maintained depends in part on the degree of pressure and liquidity of the backing layer. However, where desired, particularly at the start of the operation, an additional amount of the liquid vinyl backing plastisol 50 or other liquid resin material may be added to the nip area across the width of the carpet. The addition of such material to the nip; that is, the space between the precoated back of the carpet and the back surface of the backing layer 52 just prior to the contacting of the back of the carpet with the backing layer, may be desirable when the pressure on the carpet face is not too great. In our described embodiment, the pressure of the carpet back against the liquid layer 52 is adjusted to provide and maintain such a bank of material solely from the layer 52.

After the laying-in operation, the carpet is heated, such as by passing through an oven 56, to fuse the vinyl plastisol backing layer 52 to the back surface of the precoated carpet. The carpet is then cooled in a cooling zone 58, such as by employing water sprays onto the surface of the backing layer or by air cooling, and then sent through a shearing or cutting station wherein the carpet is cut into desired carpet tile segments. If desired, embossing or other operations to provide a skid-resistant backing may be carried out prior to the cutting step.

The carpet tile produced by the method shown in FIGS. 1 and 2 comprises a carpet 10 having a tufted face 12 and a back surface 14 on which has been formed a fused vinyl plastisol precoat layer 25, which layer on the back stitching of the carpet is bonded to a fused heavily loaded vinyl plastisol backing layer 52 with a fiber glass scrim material 62 secured to the back surface of the fused layer 52. Such a tufted carpet tile product so produced is suitable for installation on surfaces without adhesive and exhibits excellent installation and dimensional stability properties.

Typical vinyl plastisol precoat and backing formulations which may be employed in the practice of our invention are as follows:

|  | I precoat | II backing |
|---|---|---|
| 1. Resin: | | |
|   Vinyl-chloride copolymer dispersion resin | 50 | 60 |
|   Extender resin | 50 | 40 |
| 2. Plasticizer: | | |
|   Dialkyl phthalate; e.g., dioctylphthalate | 60 | 55 |
|   Butyl benzyl phthalate | 15 | 15 |
| 3. Filler: calcium carbonate (dry ground) | 75 | 150 |
| 4. Stabilizer dibasic lead phthalate | 1 | 2 |
| 5. Other pigment | | |
| Polyethylene glycol monolaurate | | 1 |
| Total | 251 | 323 |

For the purposes of illustration, the precoat formulation has been described as a low viscosity vinyl plastisol precoat; however, any precoating formulation may be employed which serves to lock in the carpet, or if desired a precoate may be entirely omitted where this is appropriate. In our preferred embodiment, the precoat formulation should, of course, be compatible with the vinyl plastisol backing layer, and thus a precoat of a vinyl plastisol is preferred. The precoating formulation may be composed of compounded latex, as well as other natural and synthetic elastomers and polymers which may, for example, include but not be limited to, precoat formulations subject to cross-linking. Some precoat formulations would comprise acrylics, olefinic resins, compounded natural and synthetic elastomers to include nitrile rubbers, ethylene vinyl acetate, a cross-linkable compatible latex system, as well as thermoplastic formulations to include vinyl chloride plastisol formulations.

The backing layer formulation employed has been described in the preferred embodiment as a heavily loaded vinyl resin plastisol; however, it is recognized and within the scope of the invention that other compositions may be employed, such as any natural and synthetic elastomeric compositions or other polymers suitable for forming a backing layer carpet or carpet tile. Such formulations may include, where desired, blowing agents so that a cellular product may be produced by heating the layer to a temperature sufficient to decompose the blowing agent after the lamination or laying-in step. A typical blowing agent suitable for use in the backing formulation would include 1 to 15 parts per hundred parts of resin of azodicarbonamide. Where such an agent is used, the preheating of layer 52 should be less than the decomposition temperature of the agent; e.g., less than 90 to 170° C. Further, if desired, a mechanically formed foam layer may be employed as the backing layer; for example, a vinyl resin plastisol having a surface tension depressant, such as a dimethoxy siloxane into which or is mechanically beaten to form a liquid vinyl foam composition. In this case, the vinyl foam after the laying-in step is heated to fuse the resin as described. Where a blowing agent is used, a carpet product having a cellular backing is produced. The backing layer should typically be compatible with and heat bondably to the precoat layer or directly with the back of the tufted carpet.

In the embodiment described, the rolling bank of material at the nip was composed essentially of the liquid preheated vinyl plastisol backing formulation. However, the rolling bank of material may be derived from the vinyl plastisol backing layer or from the vinyl precoat layer or both, or if desired, be a wholly separate material or a mixture thereof. The latter situation is suitable where the precoat and backing layers are not compatible and it is desired to interpose a liquid tie-in or intermediate layer or liquid material to induce good bonding characteristics between the precoating layer and the backing layer. For example, in some situations, the vinyl plastisol backing layer may be heated to gell and the rolling bank of material would then be either separately introduced and maintained or may come from a wet; that is, non-gelled or non-fused, precoat layer in order to insure good lamination characteristics. Where the precoat layer is used to form the rolling back, the amount of precoat applied should be increased. In other situations, it may be desirable to both pregel the backing layer and the precoat layer and to interpose in a periodic or continuous manner a liquid vinyl plastisol into the nip area in order to form the rolling bank of material as described.

Although the vinyl plastisol backing layer has been illustrated as being preheated in one embodiment, the preheating step is optional as is the preheating of the precoat layer, both prior to the laying-in operation. In our preferred operation embodiment, the precoat and backing layers are preheated vinyl plastisol formulations, and the rolling bank of material is of the more viscous backing layer, the rolling bank material maintained across the full width of the carpet being coated. Further, as illustrated, an open-type scrim or backing material may be employed on the back of the carpet to impart dimensional stability to the carpet tiles or other properties as desired. Any sheet-like material may be incorporated on the back of the carpet in place of the fiber glass open-weave woven scrim material illustrated, such as resin-reinforced paper sheet, or if desired, the scrim or sheet material may be incorporated within the backing layer, itself, such as by multiple casting techniques or interposed between the back of the carpet and the backing layer as desired.

Accordingly, our method permits a constant thickness of the total product to be achieved while completely wetting the back of the carpet by the use of the rolling bank of liquid material and eliminating through such bank the entrapment of air bubbles while permitting a limited amount of preheat prior to the lamination of the laying-in step, thereby resulting in a backed carpet product suitable for use in carpet tile.

What we claim is:

1. A method of preparing a resin-backed carpet characterized by a tufted face, which method comprises:
    (a) casting a layer of a resin-backing composition onto a release surface;
    (b) laying the back of a carpet having a fibrous tufted face onto the layer of the resin-backing composition under pressure sufficient to compress the carpet and to force the carpet back surface into intimate contact with said layer, while maintaining across the carpet width at the contact area between the carpet back and said layer a rolling bank of a liquid resin material compatible with the resin-backing composition, the rolling bank of material continually wetting and preventing the incorporation of air bubbles between the surface of the said layer and the carpet back; and
    (c) heating the resin-backing composition to bond the resin-backing composition to the back surface of the carpet to provide a resin-backed carpet.

2. The method of claim 1 wherein the back surface of the carpet includes precoat layer of a fused or gelled vinyl plastisol composition.

3. The method of claim 1 wherein the rolling bank comprises a liquid resin material obtained from compressing the layer of the backing resin composition.

4. The method of claim 1 wherein the laying of the back of the carpet onto the resin-backing composition is accomplished between opposing rollers maintained at a fixed distance from each other.

5. The method of claim 1 wherein the layer of resin-backing composition contains therein or thereon a scrim-backing sheet material to impart dimensional stability to the carpet product produced.

6. The method of claim 1 wherein the back of the carpet is precoated with a vinyl plastisol composition, which vinyl plastisol composition is pregelled or fused prior to having the back of the carpet laid on to the said layer of resin-backing composition, and wherein the resin-backing composition comprises a vinyl plastisol composition containing from about 100 to 250 parts of filler per hundred parts of resin, and wherein said backing composition is preheated to a stage less than a gelled or fusion stage prior to contact with the back surface of the carpet, and wherein the rolling bank of liquid material comprises primarily the liquid plastisol backing composition.

7. The method of claim 1 wherein the resin-backing layer is a vinyl plastisol which contains a blowing agent, and on heating, forms a vinyl foam layer.

8. A method of preparing vinyl resin-backed carpet tile, the carpet tile characterized by having a fibrous face thereon, which method comprises:
    (a) precoating the back surface of a carpet with a low-viscosity vinyl resin plastisol layer;
    (b) casting a layer of a high viscosity vinyl resin plastisol composition containing from about 100 to 250 parts of filler per hundred parts of resin onto a release surface;
    (c) laying the precoated vinyl plastisol back surface of the carpet onto the layer of the high-viscosity vinyl plastisol backing composition under sufficient pressure to force the back surface of the carpet into intimate contact with the layer of the high-viscosity vinyl plastisol backing composition, the pressure sufficient to form a rolling liquid bank of a vinyl plastisol composition at the contact area between the back surface of the carpet and the surface of the precoat backing layer across the width of the carpet;
    (d) heating the high-viscosity plastisol layer to a temperature sufficient to fuse said layer;
    (e) cooling the fused layer;
    (f) stripping the release surface from the surface of the cooled fused layer; and
    (g) cutting the resulting dimensionally stable resin-backed integral carpet into carpet tile sections.

9. The method of claim 8 which includes heating the precoated back surface of the carpet to gel or fuse the precoated vinyl plastisol layer prior to laying the back surface onto the backing layer.

10. The method of claim 8 which includes preheating the vinyl plastisol backing layer prior to laying the back surface of the carpet onto the layer, the preheat temperature insufficient to gel or fuse the vinyl plastisol backing layer.

11. The method of claim 8 wherein the carpet is compressed and laid into a wet layer of the vinyl plastisol backing composition by employing opposing rollers having a fixed but adjustable gap between said rollers of about 600 to 2000 mils.

12. The method of claim 8 which includes casting the high viscosity vinyl resin plastisol layer onto a release surface which contains thereon a fiber glass scrim sheet to impart dimensional stability to the resulting carpet tile product.

13. The method of claim 8 wherein the rolling bank of liquid material at the contact area consists essentially of the vinyl plastisol backing composition.

14. The method of claim 8 which includes injecting into the contact area a liquid resinous composition to form a liquid rolling bank of material extending from said area, and maintaining said rolling bank across the entire width of the carpet during the laying-in of the back surface of the carpet onto the wet thick layer of the vinyl plastisol backing composition.

15. A method of preparing a resin-backed carpet tile, the carpet tile characterized by having a fibrous tufted face thereon, which method comprises:
    (a) precoating the back surface of the carpet with a low-viscosity vinyl resin plastisol layer, the precoat plastisol layer adapted, when fused, to lock in the fibrous face tufts of the carpet;
    (b) heating the precoated plastisol layer to a temperature sufficient to fuse or gell the layer;
    (c) casting a layer of a high-viscosity vinyl resin plastisol composition containing from about 100 to 250 parts of filler per hundred parts of resin onto a release surface on a moving, supported belt;
    (d) heating the vinyl resin plastisol backing layer to less than a gelled or fused stage;
    (e) laying the precoated vinyl plastisol back surface of the carpet onto the preheated layer of the high-viscosity vinyl plastisol backing composition under sufficient pressure to force the precoated back surface of the carpet into intimate contact with the high-viscosity vinyl plastisol backing composition, the pressure sufficient to form a rolling liquid bank composed essentially of the high-viscosity vinyl plastisol backing compostion at the contact area between the back surface of the carpet and the surface of the layer of backing composition and across the width of the carpet, the carpet so compressed and laid into the layer of the high-viscosity vinyl plastisol backing composition supported on the release surface by opposing rollers having a fixed, but adjustable, gap therebetween;

(f) heating the high-viscosity plastisol layer to a temperature sufficient to fuse said layer and to bond the layer to the back surface of the carpet;

(g) cooling said fused layer;

(h) stripping the release surface from the surface of said cooled, fused layer; and (i) cutting the resin-backed carpet into carpet tile sections.

16. The method of claim 1 wherein the layer of the resin-backing composition comprises a vinyl plastisol composition having from about 100 to 250 parts of filler per hundred parts of resin.

17. The method of claim 1 which includes preheating the layer of the resin-backing composition to a stage less than the gelled or fused stage prior to laying the back of the carpet onto the layer.

18. The method of claim 1 which includes depositing an open-weave sheet backing material onto the release surface and casting the resin-backing composition onto the scrim material on the release surface.

19. The method of claim 1 wherein the release surface is a moving, supported, continuous belt.

20. The method of claim 1 which includes the steps of:
(a) cooling the resin-backed carpet;
(b) stripping the release surface from the back surface of the resin-backed carpet and
(c) cutting the resin-backed carpet into carpet tile sections.

References Cited
UNITED STATES PATENTS

| | | | |
|---|---|---|---|
| 3,230,134 | 11/1966 | Studer | 156—72 X |
| 3,661,691 | 5/1972 | Slosberg | 156—72 X |
| 3,014,829 | 12/1961 | Curtin | 161—406 X |
| 3,390,035 | 6/1968 | Sands | 156—72 |

EDWARD G. WHITBY, Primary Examiner

U.S. Cl. X.R.

156—250, 307, 322, 324; 161—406